United States Patent
Yoshida et al.

(10) Patent No.: US 11,670,771 B2
(45) Date of Patent: Jun. 6, 2023

(54) BATTERY INCLUDING TAB TAPE COVERING ELECTRODE TAB

(71) Applicant: SANYO Electric Co., Ltd., Daito (JP)

(72) Inventors: Masayoshi Yoshida, Osaka (JP); Oose Okutani, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 106 days.

(21) Appl. No.: 16/975,899

(22) PCT Filed: Feb. 1, 2019

(86) PCT No.: PCT/JP2019/003609
§ 371 (c)(1),
(2) Date: Aug. 26, 2020

(87) PCT Pub. No.: WO2019/167544
PCT Pub. Date: Sep. 6, 2019

(65) Prior Publication Data
US 2021/0005869 A1    Jan. 7, 2021

(30) Foreign Application Priority Data
Feb. 28, 2018 (JP) .............................. JP2018-035677

(51) Int. Cl.
*H01M 4/58* (2010.01)
*H01M 4/505* (2010.01)
(Continued)

(52) U.S. Cl.
CPC ............. *H01M 4/58* (2013.01); *H01M 4/505* (2013.01); *H01M 4/60* (2013.01); *H01M 50/533* (2021.01);
(Continued)

(58) Field of Classification Search
CPC ........ H01M 50/54; H01M 4/505; H01M 4/58; H01M 4/60
See application file for complete search history.

(56) References Cited

U.S. PATENT DOCUMENTS

2004/0224225 A1* 11/2004 Yamashita ........... H01M 50/116
429/181
2008/0295959 A1    12/2008 Ishigaki et al.
(Continued)

FOREIGN PATENT DOCUMENTS

CN    105529433 B * 10/2018 .......... H01M 2/1653
JP    2007-332258 A    12/2007
(Continued)

OTHER PUBLICATIONS

Creative Mechanisms Staff, "Everything you need to know about acrylic (PMMA)"; Published Mar. 16, 2016, p. 3 (Year: 2016).*
(Continued)

*Primary Examiner* — Jimmy Vo
(74) *Attorney, Agent, or Firm* — WHDA, LLP

(57) ABSTRACT

A battery according to an aspect of the present disclosure includes: a positive electrode, a negative electrode, a positive electrode tab electrically connected to the positive electrode; a negative electrode tab electrically connected to the negative electrode; a positive electrode tab tape covering the positive electrode tab: and a negative electrode tab tape covering the negative electrode tab. In the battery described above, at least one tab tape of the positive electrode tab tape and the negative electrode tab tape has a multilayer structure in which an adhesive layer and a substrate layer primarily formed from an organic material are laminated in this order from an electrode tab side, and the adhesive layer contains an adhesive material and a reactive material which generates
(Continued)

an endothermic reaction at a temperature lower than a heat resistance temperature of the organic material.

2 Claims, 3 Drawing Sheets

(51) Int. Cl.
    *H01M 4/60*       (2006.01)
    *H01M 50/534*    (2021.01)
    *H01M 50/533*    (2021.01)
    *H01M 50/586*    (2021.01)
    *H01M 50/595*    (2021.01)
    *H01M 50/54*     (2021.01)
    *H01M 50/593*    (2021.01)

(52) U.S. Cl.
    CPC ....... *H01M 50/534* (2021.01); *H01M 50/586* (2021.01); *H01M 50/595* (2021.01); *H01M 50/54* (2021.01); *H01M 50/593* (2021.01)

(56) References Cited

U.S. PATENT DOCUMENTS

| | | |
|---|---|---|
| 2014/0120417 A1 | 5/2014 | Matsushita et al. |
| 2016/0152872 A1 | 6/2016 | Furuta et al. |
| 2017/0244087 A1 | 8/2017 | Kawabe |
| 2017/0309951 A1 | 10/2017 | Ishikawa et al. |
| 2018/0159136 A1 | 6/2018 | Shiozaki et al. |
| 2018/0375083 A1* | 12/2018 | Takahashi ............... B32B 27/08 |

FOREIGN PATENT DOCUMENTS

| | | |
|---|---|---|
| JP | 2008-297399 A | 12/2008 |
| JP | 2014-089856 A | 5/2014 |
| JP | 2016-091939 A | 5/2016 |
| JP | 2017-152372 A | 8/2017 |
| WO | 2014/192886 A1 | 12/2014 |
| WO | 2016/052293 A1 | 4/2016 |
| WO | 2016/121339 A1 | 8/2016 |
| WO | 2017/038010 A1 | 3/2017 |
| WO | WO-2017149961 A1 * | 9/2017 ............. H01M 4/366 |

OTHER PUBLICATIONS

International Search Report dated Apr. 23, 2019, issued in counterpart Application No. PCT/JP2019/003609.

Extended (Supplementary) European Search Report dated Mar. 23, 2021, issued in counterpart EP application No. 19759959.0. (8 pages).

English Translation of Office Action dated Mar. 30, 2022, issued in counterpart CN Application No. 201980014994.3. (4 pages).

* cited by examiner

BATTERY INCLUDING TAB TAPE COVERING ELECTRODE TAB

TECHNICAL FIELD

The present invention relates to a battery using a tab tape which covers an electrode tab.

BACKGROUND ART

Heretofore, a battery has been proposed in which an insulating property of a positive electrode or a negative electrode is improved by using a tab tape which covers an electrode tab.

Patent Document 1 has disclosed a lithium ion secondary battery which suppresses breakage of a current collector at a portion at which the current collector and a lead is in contact with each other.

FIG. 4 is a structural view of a positive electrode of the lithium ion secondary battery disclosed in PTL 1, FIG. 4(A) is a partial plan view of the positive electrode when observed from one main surface side of the current collector, and FIG. 4(B) is a cross-sectional view taken along a line L1-L1 in FIG. 4(A).

As shown in FIG. 4, an insulating tape 44 disposed at one main surface side of a positive electrode collector 40A covers a positive electrode collector exposed surface 40a in a double-side uncoated portion 40b on which no positive electrode mixture layers 40B are formed, a positive electrode lead 42 on the positive electrode collector exposed surface 40a, and a protective layer 46 provided between a lower end portion of the positive electrode lead 42 and the positive electrode collector exposed surface 40a. This insulating tape 44 is provided to prevent heat generation of the battery, for example, in the case in which a separator or the like is fractured in a battery abnormal condition and/or a positive electrode and a negative electrode are brought into contact with each other.

CITATION LIST

Patent Literature

PTL 1: Japanese Published Unexamined Patent Application No. 2014-89856

SUMMARY OF INVENTION

Technical Problem

However, in the lithium ion secondary battery disclosed in PTL 1, for example, by an external short circuit or the like, when a large current flows through the positive electrode lead 42 (hereinafter, referred to as "positive electrode tab"), and the temperature thereof is increased high, the insulating tape 44 (hereinafter, referred to as "tab tape") which covers the positive electrode tab may be melted or decomposed, and as a result, in some cases, the tab tape may disappear, or an electrically conductive carbide may be precipitated. In the case as described above, for example, the insulation of the positive electrode tab protected by the tab tape is not maintained, an internal short circuit occurs between the positive electrode tab and the negative electrode, and as a result, a battery temperature may be increased in some cases. In addition, although the phenomenon as described above generally occurs at a positive electrode tab side, it may also occur at a negative electrode tab side in some cases.

Accordingly, an object of the present disclosure is to provide a battery in which even when a large current flows through an electrode tab, and a temperature thereof is increased high, melting or decomposition of a tab tape covering the electrode tab can be suppressed.

Solution to Problem

A battery according to an aspect of the present disclosure comprises: a positive electrode, a negative electrode, a positive electrode tab electrically connected to the positive electrode; a negative electrode tab electrically connected to the negative electrode; and a positive electrode tab tape covering the positive electrode tab. In the battery described above, the positive electrode tab tape has a multilayer structure in which an adhesive layer and a substrate layer primarily formed from an organic material are laminated in this order from an electrode tab side, and the adhesive layer contains an adhesive material and a reactive material which generates an endothermic reaction at a temperature lower than a heat resistance temperature of the organic material.

A battery according to another aspect of the present disclosure comprises: a positive electrode, a negative electrode, a positive electrode tab electrically connected to the positive electrode; a negative electrode tab electrically connected to the negative electrode; and a negative electrode tab tape covering the negative electrode tab. In the battery described above, the negative electrode tab tape has a multilayer structure in which an adhesive layer and a substrate layer primarily formed from an organic material are laminated in this order from an electrode tab side, and the adhesive layer contains an adhesive material and a reactive material which generates an endothermic reaction at a temperature lower than a heat resistance temperature of the organic material.

Advantageous Effects of Invention

According to the present disclosure, even when a large current flows through the electrode tab, and the temperature thereof is increased high, melting or decomposition of the tab tape covering the electrode tab can be suppressed.

DESCRIPTION OF EMBODIMENTS

Figure 1:
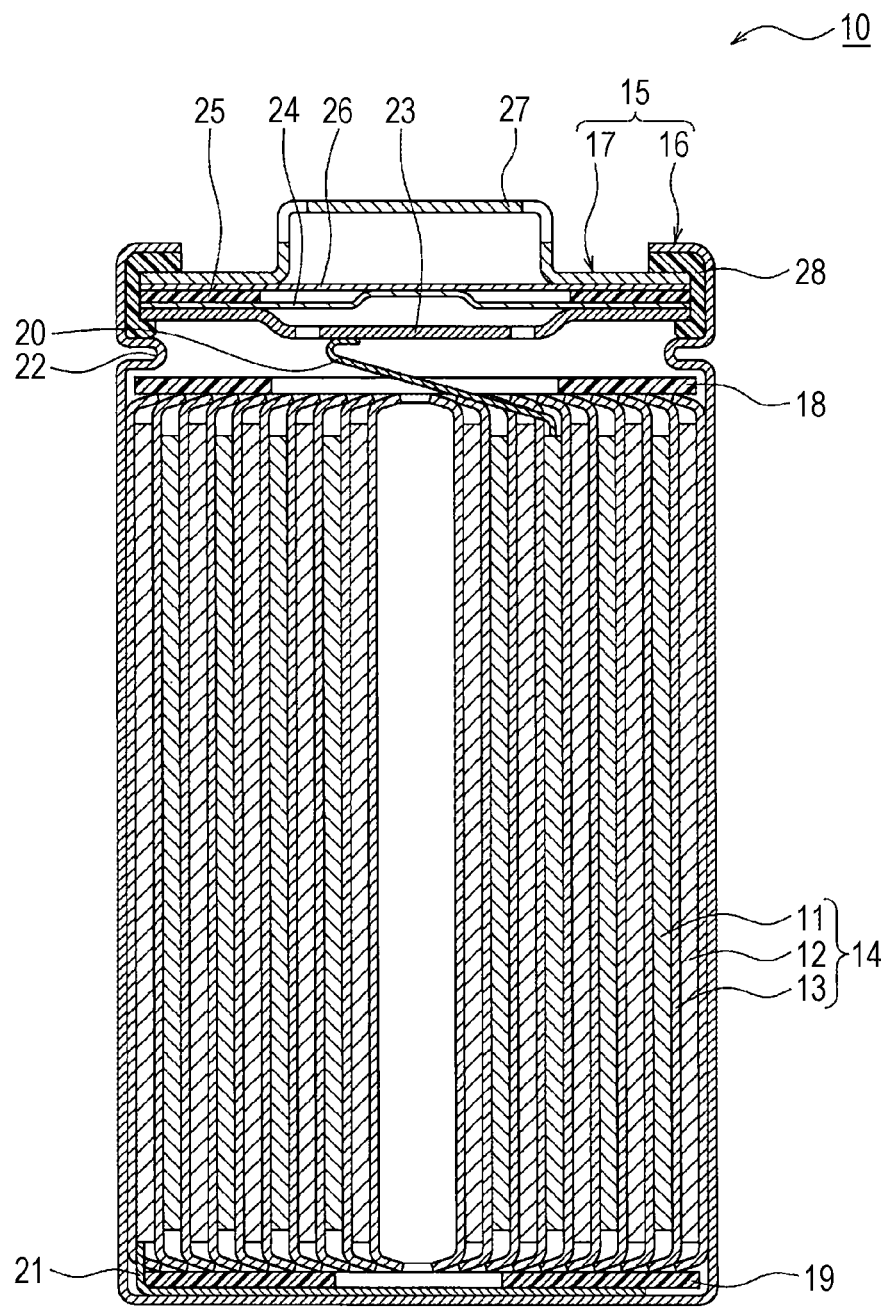
FIG. 1 is a cross-sectional view of a battery according to an embodiment.

Hereinafter, one example of a battery according to one aspect of the present disclosure will be described. The drawings used in the description of the following embodiments are schematically drawn, and for example, dimensional ratios of constituent elements shown in the drawings may be different from those of actual constituent elements in some cases.

FIG. 1 is a cross-sectional view of a battery according to an embodiment. Although a battery 10 shown in FIG. 1 is one example of a lithium ion secondary battery, the battery according to this embodiment is not limited to a lithium ion secondary battery and may be an alkali-based secondary battery or the like or may also be a primary battery. Hereinafter, the battery 10 shown in FIG. 1 is called a lithium ion secondary battery 10.

The lithium ion secondary battery 10 includes a winding type electrode body 14 in which a positive electrode 11 and a negative electrode 12 are wound with at least one separator 13 interposed therebetween, a nonaqueous electrolyte, insulating plates 18 and 19 disposed on the top and the bottom of the electrode body 14, a positive electrode tab 20, a negative electrode tab 21, a positive electrode tab tape (not shown) covering the positive electrode tab 20, a negative electrode tab tape (not shown) covering the negative electrode tab 21, and a battery case 15. In this embodiment, although the positive electrode tab 20 and the negative electrode tab 21 are covered with the tab tapes, one of the positive electrode tab 20 and the negative electrode tab 21 may be not covered with the tab tape.

The electrode body 14 is not limited to a winding type and, for example, another type, such as a laminate type in which positive electrodes and negative electrodes are alternately laminated with separators interposed therebetween, may also be used.

The battery case 15 is a case receiving the electrode body 14, the electrolyte, and the like and, for example, includes a bottom-closed cylindrical case main body 16 having an opening portion and a sealing body 17 which seals the opening portion of the case main body 16. The battery case 15 preferably includes a gasket 28 provided between the case main body 16 and the sealing body 17, and hence, an air-tightness in the battery can be secured. The battery case 15 is not limited to a cylindrical type and may be, for example, a square type, a laminate type, or the like.

The case main body 16 may have a protruding portion 22 which is formed, for example, by protruding a part of a side surface portion to the inside and which supports the sealing body 17. The protruding portion 22 is preferably formed to have a ring shape along a circumferential direction of the case main body 16, and an upper surface of the protruding portion 22 supports the sealing body 17.

The sealing body 17 has the structure in which a filter 23, a lower valve 24, an insulating member 25, an upper valve 26, and a cap 27 are laminated in this order from an electrode body 14 side. The members forming the sealing body 17 each have, for example, a disc shape or a ring shape and are electrically connected to each other except for the insulating member 25. The lower valve 24 and the upper valve 26 are connected to each other at the central portions thereof, and between the peripheral portions thereof, the insulating member 25 is provided. When an inside pressure is increased by heat generation due to an internal short circuit or the like, for example, since the lower valve 24 is deformed so as to push up the upper valve 26 toward a cap 27 side and is fractured, an electric current path between the lower valve 24 and the upper valve 26 is blocked. When the inside pressure is further increased, the upper valve 26 is fractured, and a gas is exhausted from an opening portion of the cap 27.

The positive electrode tab 20 is electrically connected at one end thereof, to the positive electrode 11. In addition, the positive electrode tab 20 extends from the positive electrode 11 to the filter 23 through a through-hole of the insulating plate 18, and the other end of the positive electrode tab 20 is electrically connected to a lower surface of the filter 23. Accordingly, the cap 27 electrically connected to the filter 23 functions as a positive electrode terminal. In addition, the negative electrode tab 21 is electrically connected at one end thereof, to the negative electrode 12. In addition, the negative electrode tab 21 extends from the negative electrode 12 to an inner surface of a bottom portion of the case main body 16 along the outside of the insulating plate 19, and the other end of the negative electrode tab 21 is electrically connected to the inner surface of the bottom portion of the case main body 16. Accordingly, the case main body 16 functions as a negative electrode terminal.

Hereinafter, by using the positive electrode tab tape which covers the positive electrode tab 20 as an example, although the tab tape of this embodiment will be described, the tab tape according to this embodiment may also be used as the negative electrode tab tape which covers the negative electrode tab 21. That is, the following tab tape to be described may be used for the positive electrode tab tape which covers the positive electrode tab 20, for the negative electrode tab tape which covers the negative electrode tab 21, or for both of them. When a plurality of positive electrode tabs are electrically connected to the positive electrode 11, all the positive electrode tabs are not always required to be covered with respective positive electrode tab tapes. In the case in which a plurality of negative electrode tabs are electrically connected to the negative electrode 12, the same as described above may also be applied.

Figure 2:
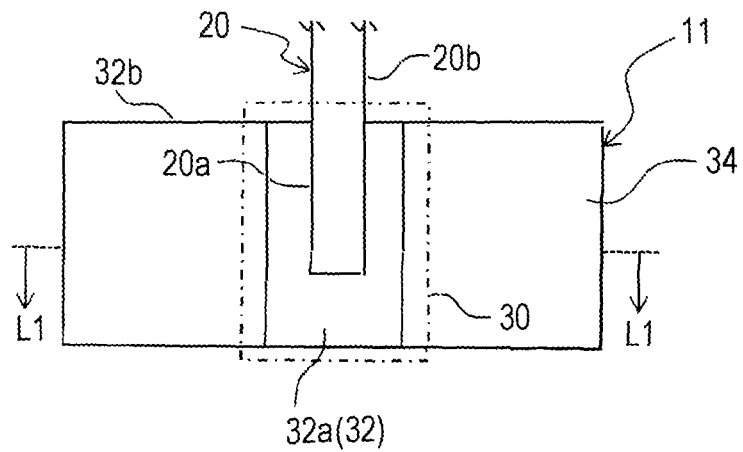
FIG. 2(A) is a partial plan view of a positive electrode when observed from one main surface side thereof.
FIG. 2(B) is a cross-sectional view taken along a line L1-L1 shown in FIG. 2(A).
Figure 2:
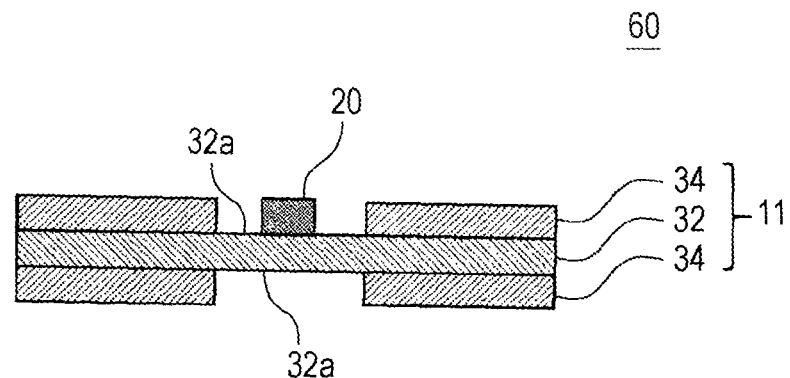

FIG. 2(A) is a partial plan view of the positive electrode when observed from one main surface side thereof, and FIG. 2(B) is a cross-sectional view taken along a line L1-L1 in FIG. 2(A). In addition, in FIG. 2, in order to clearly show the structure of the positive electrode 11, in FIG. 2(A), the positive electrode tab tape (reference numeral 30) covering the positive electrode tab 20 is shown by a chain line as a perspective view, and in FIG. 2(B), the positive electrode tab tape is not shown.

The positive electrode 11 includes a positive electrode collector 32 and positive electrode active material layers 34 formed on the positive electrode collector 32. For the positive electrode collector 32, for example, foil of a metal, such as aluminum, stable in a potential range of the positive electrode or a film including the metal mentioned above disposed as a surface layer may be used. The positive electrode active material layer 34 contains a positive electrode active material. In addition, the positive electrode active material layer 34 preferably contains, besides the positive electrode active material, an electrically conductive material and a binding material.

As the positive electrode active material contained in the positive electrode active material layer 34, for example, a lithium transition metal composite oxide may be mentioned, and in particular, for example, there may be used lithium cobaltate, lithium manganate, lithium nickelate, a lithium nickel manganese composite oxide, or a lithium nickel cobalt composite oxide. In addition, to the lithium transition metal composite oxide, for example, Al, Ti, Zr, Nb, B, W, Mg, or Mo may also be added.

As the electrically conductive material contained in the positive electrode active material layer 34, for example, a carbon powder, such as carbon black, acetylene black, Ketjen black, or graphite, may be mentioned. Those materials may be used alone, or at least two types thereof may be used in combination.

As the binding material contained in the positive electrode active material layer 34, for example, a fluorine-based polymer or a rubber-based polymer may be mentioned. For example, as the fluorine-based polymer, a polytetrafluoroethylene (PTFE), a poly(vinylidene fluoride) (PVdF), or its modified material may be mentioned, and as the rubber-based polymer, for example, an ethylene-propylene-isoprene copolymer or an ethylene-propylene-butadiene copolymer may be mentioned. Those materials may be used alone, or at least two types thereof may be used in combination.

The positive electrode collector 32 has exposed portions 32a at each of which the positive electrode mixture layer 34 is not formed. In addition, the exposed portions 32a shown in FIG. 2 are formed both at one primary surface side and the other primary surface side of the positive electrode collector 32. Although the exposed portion 32a may be formed at any place of the positive electrode collector 32, in general, the exposed portion 32a is formed at a longitudinal-direction central portion of the positive electrode collector 32.

The positive electrode tab 20 includes one end portion 20a connected to the exposed portion 32a of the positive electrode collector 32 and an extension portion 20b extending from the one end portion 20a to the outside of a peripheral portion 32b of the positive electrode collector 32. In addition, although not shown in FIG. 2, the positive electrode tab 20 includes the other end portion at a front end side apart from the extension portion 20b, and as described above, the other end portion is connected to the filter 23 of the sealing body 17. As long as an electrical connection is secured, a method for connecting the one end portion 20a of the positive electrode tab 20 to the exposed portion 32a of the positive electrode collector 32 and a method for connecting the other end portion of the positive electrode tab 20 to the sealing body 17 are not particularly limited, and for example, ultrasonic welding may be mentioned.

A raw material of the positive electrode tab 20 is not particularly limited, for example, to a metal such as aluminum or titanium.

A positive electrode tab tape 30 (hereinafter, simply referred to as "tab tape 30") shown in FIG. 2 covers the one end portion 20a of the positive electrode tab 20. That is, the tab tape 30 covers the positive electrode tab 20 located on the exposed portion 32a of the positive electrode collector 32. The position of the positive electrode tab 20 to be covered with the tab tape 30 is not limited to the one end portion 20a of the positive electrode tab 20 and, for example, may be the extension portion 20b of the positive electrode tab 20 or the other end portion functioning as a connection portion with the sealing body 17. Since an internal short circuit generated between the positive electrode tab 20 and the negative electrode 12 occurs mainly between the one end portion 20a of the positive electrode tab 20 and the negative electrode 12 and/or between the extension portion 20b of the positive electrode tab 20 and the negative electrode 12, the tab tape 30 preferably covers at least one of the one end portion 20a and the extension portion 20b of the positive electrode tab 20 and particularly preferably covers the one end portion 20a of the positive electrode tab 20. In addition, when the one end portion 20a of the positive electrode tab 20 is covered with the tab tape 30, the one end portion 20a of the positive electrode tab 20 may be partially covered with the tab tape 30; however, for example, in order to effectively suppress the generation of an internal short circuit, the one end portion 20a is preferably entirely covered. In addition, in the case in which the extension portion 20b of the positive electrode tab 20 is covered with the tab tape 30, the extension portion 20b may also be partially covered with the tab tape 30; however, the extension portion 20b is preferably entirely covered. In addition, when the extension portion 20b of the positive electrode tab 20 is partially or entirely covered with the tab tape 30, the tab tape 30 is preferably wound around the extension portion 20b so as to cover the entire periphery of the extension portion 20b.

In addition, as shown in FIG. 2, the tab tape 30 may also cover the exposed portion 32a of the positive electrode collector 32 besides the one end portion 20a of the positive electrode tab 20. When the exposed portion 32a is covered with the tab tape 30, although the exposed portion 32a may be partially covered with the tab tape 30, for example, in order to effectively suppress the generation of an internal short circuit and/or to suppress foil breakage of the positive electrode collector 32, the exposed portion 32a is preferably entirely covered.

Hereinafter, the structure of the tab tape 30 will be described.

Figure 3:
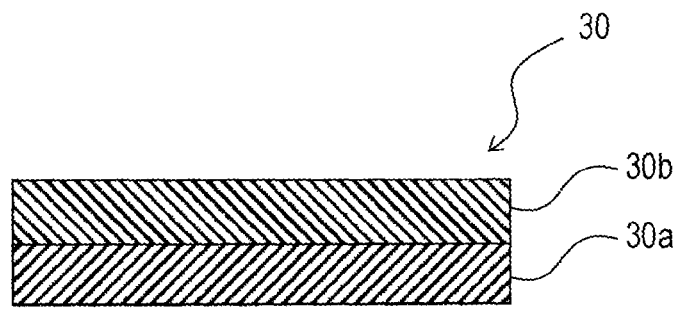
FIG. 3 is a partial cross-sectional view of a tab tape to be used in this embodiment.
Figure 4:
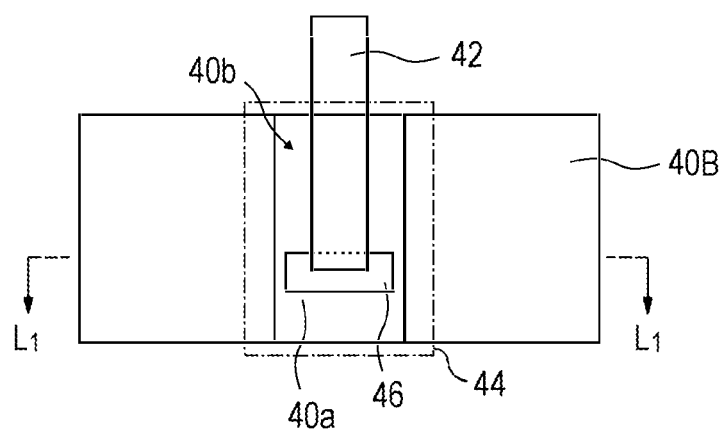
FIGS. 4 (A) and 4 (B) are a structural view of a positive electrode of a lithium ion secondary battery disclosed in PTL 1.
Figure 4:
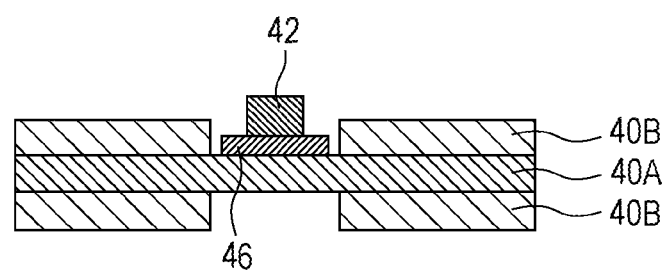

FIG. 3 is a partial cross-sectional view of a tab tape to be used in this embodiment. As shown in FIG. 3, the tab tape 30 includes an adhesive layer 30a and a substrate layer 30b. The adhesive layer 30a of the tab tape 30 is a layer to be adhered to the positive electrode tab 20. That is, the tab tape 30 has a multilayer structure in which from a positive electrode tab 20 side, the adhesive layer 30a and the substrate layer 30b are laminated in this order.

The substrate layer 30b is not particularly limited as long as being a layer primarily formed from an organic material. In view of the flexibility, the strength, and the like of the tab tape, the organic material is preferably a polymer material, and for example, there may be mentioned a cellulose derivative (such as a cellulose ether or a cellulose ester), a poly(vinyl chloride), a polyolefin (such as a polyethylene or a polypropylene), a polystyrene, a polyester (such as poly (ethylene terephthalate)), a polyimide, a polyamide, a polycarbonate, or a poly(phenylene sulfide). Those materials mentioned above may be used alone, or at least two types thereof may be used in combination. In addition, if needed, a stretching step may also be performed on the substrate layer 30b.

In view of the heat resistance property and the like of the substrate layer 30b, the organic material preferably includes an organic material having a high heat resistance temperature, and for example, at least one of a polyimide, a poly(phenylene sulfide), and a polyamide is preferably contained. The heat resistance temperatures of a polyimide, a poly(phenylene sulfide), and a polyamide are approximately 370° C., approximately 280° C., and 170° C. to 270° C., respectively. In this embodiment, the heat resistance temperature of the organic material indicates a melting point or a decomposition start temperature of the organic material.

Although the thickness of the substrate layer 30b may be arbitrarily determined, in view of the strength and the like of the tab tape 30, for example, the thickness is preferably 8 to 50 μm and more preferably 12 to 25 μm.

The term "being primarily formed from an organic material" indicates that among materials forming the substrate layer 30b, the rate of the organic material is highest; however, in view of the strength and the like of the tab tape 30, for example, the content of the organic material with respect to the total mass of the substrate layer 30b is preferably 90 percent by mass or more and more preferably 100 percent by mass. In addition, to contain a filler of a frame retardant inorganic material or the like in the substrate layer 30b is not limited; however, for example, in view of the flexibility of the tab tape 30, no filler is preferably contained.

The adhesive layer 30a contains an adhesive material and a reactive material. Although the adhesive material is not particularly limited as long as having an adhesive property to the positive electrode tab 20, for example, since a step of adhering the tab tape 30 may be easily performed, a material having a glass transition temperature of 60° C. or less is preferable, and a material having a glass transition temperature of −70° C. to 50° C. is more preferable. In particular, for example, a rubber-based resin, an acrylic-based resin, or a silicone-based resin is preferable. Those resins mentioned above may be used alone, or at least two types thereof may be used in combination.

As the reactive material, although any material which generates an endothermic reaction at a temperature lower than the heat resistance temperature of the organic material of the substrate layer 30b may be used without any particular limitation, for example, there may be mentioned a metal hydroxide, such as aluminum hydroxide or magnesium hydroxide, a carbonate salt such as calcium carbonate, a hydrogen carbonate salt such as sodium hydrogen carbonate, an inorganic compound hydrate such as calcium sulfate dihydrate, a clay mineral, or zinc borate.

Examples of the endothermic reaction by the reactive material are shown below.

$$\text{Aluminum hydroxide: } Al(OH)_3 \rightarrow \tfrac{1}{2}Al_2O_3 + 3/2 H_2O \quad (1)$$

Endothermic reaction temperature of aluminum hydroxide: approximately 320° C.

$$\text{Magnesium hydroxide: } Mg(OH)_2 \rightarrow MgO + H_2O \quad (2)$$

Endothermic reaction temperature of magnesium hydroxide: approximately 370° C.

$$\text{Calcium carbonate: } CaCO_3 \rightarrow CaO + CO_2 \quad (3)$$

Endothermic reaction temperature of calcium carbonate: approximately 670° C.

$$\text{Sodium hydrogen carbonate: } NaHCO_3 \rightarrow \tfrac{1}{2}Na_2CO_3 + \tfrac{1}{2}CO_2 + \tfrac{1}{2}H_2O \quad (4)$$

Endothermic reaction temperature of sodium hydrogen carbonate: approximately 130° C.

$$\text{Calcium sulfate dihydrate: } CaSO_4 \cdot 2H_2O \rightarrow CaSO_4 + 2H_2O \quad (5)$$

Endothermic reaction temperature of calcium sulfate dihydrate: approximately 130° C.

As described above, for example, by an external short circuit or the like, a large current flows through the positive electrode tab 20, and the temperature thereof may be increased high in some cases. In this case, when a tab tape including an adhesive layer which contains no reactive material described above is used as in the past, by the positive electrode tab 20 heated to a high temperature, an organic material forming a substrate layer of the tab tape is melted or decomposed, and the tab tape may disappear, or an electrically conductive carbide, such as carbon, may be precipitated, so that the insulation of the positive electrode tab protected by the tab tape may not be maintained in some cases. On the other hand, in this embodiment, since the tab tape 30 including the adhesive layer 30a which contains the reactive material described above is used, when the temperature of the positive electrode tab 20 is increased high, before the organic material forming the substrate layer 30b is melted or decomposed, an endothermic reaction of the reactive material in the adhesive layer 30a occurs; hence, the increase in temperature of the positive electrode tab 20 is suppressed, and as a result, the melting or decomposition of the organic material forming the substrate layer 30b is suppressed. Accordingly, for example, the insulation of the positive electrode tab 20 protected by the tab tape 30 is maintained, and the internal short circuit between the positive electrode tab 20 and the negative electrode 12 is suppressed.

In a lithium ion secondary battery, when an external short circuit or the like occurs, and a large current flows through the positive electrode tab 20, the temperature of the positive electrode tab 20 may be increased to 400° C. or more in some cases. Hence, as the reactive material which effectively suppresses the melting or decomposition of the organic material forming the substrate layer 30b, a material which generates an endothermic reaction at a temperature lower than the heat resistance temperature of the organic material and at a temperature of 100° C. to 350° C. is preferable. In particular, aluminum hydroxide, magnesium hydroxide, calcium carbonate, sodium hydrogen carbonate, or calcium sulfate dihydrate is preferable. Those materials may be used alone, or at least two types thereof may be used in combination. Furthermore, among those materials, aluminum hydroxide, magnesium hydroxide, sodium hydrogen carbonate, or calcium sulfate dihydrate is preferable. As apparent from the above reaction formulas, since the endothermic reactions of aluminum hydroxide, magnesium hydroxide, sodium hydrogen carbonate, and calcium sulfate dihydrate are each a dehydration reaction which releases water, the increase in temperature of the positive electrode tab 20 is more effectively suppressed, and the melting or decomposition of the organic material forming the substrate layer 30b is further suppressed. In addition, when the exposed portion 32a of the positive electrode collector 32 is also covered with the tab tape 30, the increase in temperature of the exposed portion 32a is also suppressed.

Although the thickness of the adhesive layer 30a may be arbitrarily determined, in view of the adhesive property of the tab tape 30, the effective suppression of the melting or decomposition of the organic material forming the substrate layer 30b, and the like, for example, the thickness of the adhesive layer 30a is preferably 1 to 10 μm and more preferably 2 to 5 μm.

In view of the effective suppression of the melting or decomposition of the organic material forming the substrate layer 30b and the like, the content of the reactive material with respect to the total mass of the adhesive layer 30a is, for example, preferably 10 to 50 percent by mass and more preferably 20 to 40 percent by mass.

The adhesive layer 30a may contain, besides the adhesive material and the reactive material, a filler of a flame retardant inorganic material or the like. As the filler, for example, there may be mentioned a flame retardant inorganic material, such as a metal oxide including at least one of alumina, zirconia, silica, magnesia, and titania, a metal nitride, a metal carbide, a metal carbonate salt, or the like.

Hereinafter, the negative electrode 12, the electrolyte, and the separator 13 will be described.

The negative electrode 12 includes a negative electrode collector and at least one negative electrode active material layer formed on the negative electrode collector. As the negative electrode collector, for example, there may be used foil of a metal, such as copper, stable in a negative electrode potential range or a film including the metal mentioned above disposed as a surface layer. The negative electrode active material layer contains a negative electrode active material. The negative electrode active material layer preferably contains, besides the negative electrode active material, a thickening agent and a binding agent.

As the negative electrode active material, a carbon material capable of occluding and releasing lithium ions may be used, and besides graphite, a non-graphitizable carbon, a graphitizable carbon, a fibrous carbon, a coke, a carbon black, or the like may also be used. Furthermore, as a non-carbon material, silicon or tin may be used, or an alloy or oxide, each of which contains the metal mentioned above, may also be used.

As the binding material, as is the case of the positive electrode, although a PTFE or the like may be used, for example, a styrene-butadiene copolymer (SBR) or its modified material may also be used. As the thickening agent, for example, a carboxymethyl cellulose (CMC) may be used.

Although being not described with reference to the drawings, as is the case of the positive electrode collector 32 described above, the negative electrode collector also has an exposed portion at which no negative electrode active material layer is formed. In addition, although the exposed portion of the negative electrode collector may be formed at any place of the negative electrode collector, in general, the exposed portion is formed at a longitudinal-direction end portion side of the negative electrode collector. In addition, as is the case of the positive electrode tab 20 described above, the negative electrode tab 21 includes one end portion connected to the exposed portion of the negative electrode collector and an extension portion extending from the one end portion to the outside of a peripheral portion of the negative electrode collector. In addition, the negative electrode tab 21 has the other end portion at a front end side apart from the extension portion, and as described above, the other end portion is connected to the inner surface of the bottom portion of the case main body 16. A raw material of the negative electrode tab 21 is not particularly limited, for example, to a meal, such as nickel or titanium.

At least one of the one end portion, the extension portion, and the other end portion of the negative electrode tab 21 is covered with the negative electrode tab tape. In addition, the exposed portion of the negative electrode collector is also preferably covered with the negative electrode tab tape.

The negative electrode tab tape is preferably formed to have the structure similar to that of the tab tape 30 shown in FIG. 3. For example, in the case in which by the increase in temperature of the negative electrode tab 21 due to an external short circuit or the like, since the negative electrode tab tape is melted or decomposed, the insulating property of the negative electrode tab 21 protected by the negative electrode tab tape is not maintained, and as a result, an internal short circuit may occur between the negative electrode tab 21 and the positive electrode 11 in some cases, by using the tab tape 30 shown in FIG. 3 as the negative electrode tab tape, the internal short circuit between the negative electrode tab 21 and the positive electrode 11 can be suppressed.

In general, the increase in temperature of the negative electrode tab 21 due to an external short circuit or the like is lower than that of the positive electrode tab 20, as an organic material of a substrate layer of the negative electrode tab tape, a material having a low heat resistance temperature than that of the organic material of the substrate layer of the positive electrode tab tape may be used. In particular, for example, there may be mentioned a cellulose derivative (such as a cellulose ether or a cellulose ester), a poly(vinyl chloride), a polyolefin (such as a polyethylene or a polypropylene), a polystyrene, a polyester (such as poly(ethylene terephthalate)), or a polycarbonate. In addition, when a material, such as a polypropylene, having a low heat resistance temperature is used for the substrate layer of the negative electrode tab tape, and a reactive material is contained in the adhesive layer, the reactive material is preferably a material which generates an endothermic reaction, for example, at 100° C. to 200° C. In particular, for example, sodium hydrogen carbonate or calcium sulfate dihydrate is preferable.

The nonaqueous electrolyte contains, for example, a nonaqueous solvent and an electrolyte salt dissolved in the nonaqueous solvent. The nonaqueous electrolyte is not limited to a liquid electrolyte and may be a solid electrolyte using a gel polymer or the like. As the nonaqueous solvent, for example, a carbonate, a lactone, an ether, a ketone, an ester, or a mixed solvent containing at least two of those mentioned above may be used.

As the electrolyte salt, for example, a lithium salt may be mentioned, and for example, $LiPF_6$, $LiBF_4$, $LiCF_3SO_3$, or a mixture containing at least two of those mentioned above may be used. The content of the electrolyte salt to the solvent is, for example, 0.5 to 2.0 mol/L.

For the separator 13, for example, a porous sheet having an ion permeability and an insulating property may be used. As a particular example of the porous sheet, for example, a fine porous thin film, a woven cloth, or a non-woven cloth may be mentioned. As a raw material of the separator 13, an olefin-based resin, such as a polyethylene or a polypropylene, or a cellulose is preferable. The separator 13 may be a laminate including a cellulose fiber layer and a thermoplastic resin fiber layer formed from an olefin-based resin or the like. In addition, a multilayer separator including a polyethylene layer and a polypropylene layer may also be used, and a separator having a surface to which a material, such as an aramid-based resin or a ceramic, is applied may also be used.

REFERENCE SIGNS LIST

10 lithium ion secondary battery, 11 positive electrode, 12 negative electrode, 13 separator, 14 electrode body, 15 battery case, 16 case main body, 17 sealing body, 18, 19 insulating plate, 20 positive electrode tab, 20a one end portion, 20b extension portion, 21 negative electrode tab, 22 protruding portion, 23 filter, 24 lower valve, 25 insulating member, 26 upper valve, 27 cap, 28 gasket, 30 tab tape, 30a adhesive layer, 30b substrate layer, 32 positive electrode collector, 32a exposed portion, 32b peripheral portion, 34 positive electrode active material layer

The invention claimed is:

1. A battery comprising: a positive electrode; a negative electrode; a positive electrode tab electrically connected to the positive electrode; a negative electrode tab electrically connected to the negative electrode; and a positive electrode tab tape covering the positive electrode tab,
   wherein the positive electrode tab tape has a multilayer structure in which an adhesive layer and a substrate layer primarily formed from an organic material are laminated in this order from an electrode tab side,
   the adhesive layer contains an adhesive material and a reactive material which generates an endothermic reaction that involves a chemical change in the reactive material at a temperature that is lower than a heat resistance temperature of the organic material and within a range from 100° C. to 350° C.,
   the adhesive material includes at least one of a rubber-based resin, an acrylic-based resin, and a silicone-based resin,
   the reactive material includes at least one of aluminum hydroxide, sodium hydrogen carbonate, and calcium sulfate dihydrate, and
   the adhesive layer is in direct contact with the positive electrode tab.

2. A battery comprising: a positive electrode; a negative electrode; a positive electrode tab electrically connected to the positive electrode; a negative electrode tab electrically connected to the negative electrode; and a negative electrode tab tape covering the negative electrode tab,
- wherein the negative electrode tab tape has a multilayer structure in which an adhesive layer and a substrate layer primarily formed from an organic material are laminated in this order from an electrode tab side,
- the adhesive layer contains an adhesive material and a reactive material which generates an endothermic reaction that involves a chemical change in the reactive material at a temperature that is lower than a heat resistance temperature of the organic material and within a range from 100° C. to 350° C.,
- the adhesive material includes at least one of a rubber-based resin, an acrylic-based resin, and a silicone-based resin,
- the reactive material includes at least one of aluminum hydroxide, sodium hydrogen carbonate, and calcium sulfate dihydrate, and
- the adhesive layer is in direct contact with the negative electrode tab.

\* \* \* \* \*